Nov. 27, 1956 G. H. BROWN 2,771,843
PRESSURE REGULATOR
Filed Dec. 13, 1951 3 Sheets-Sheet 1
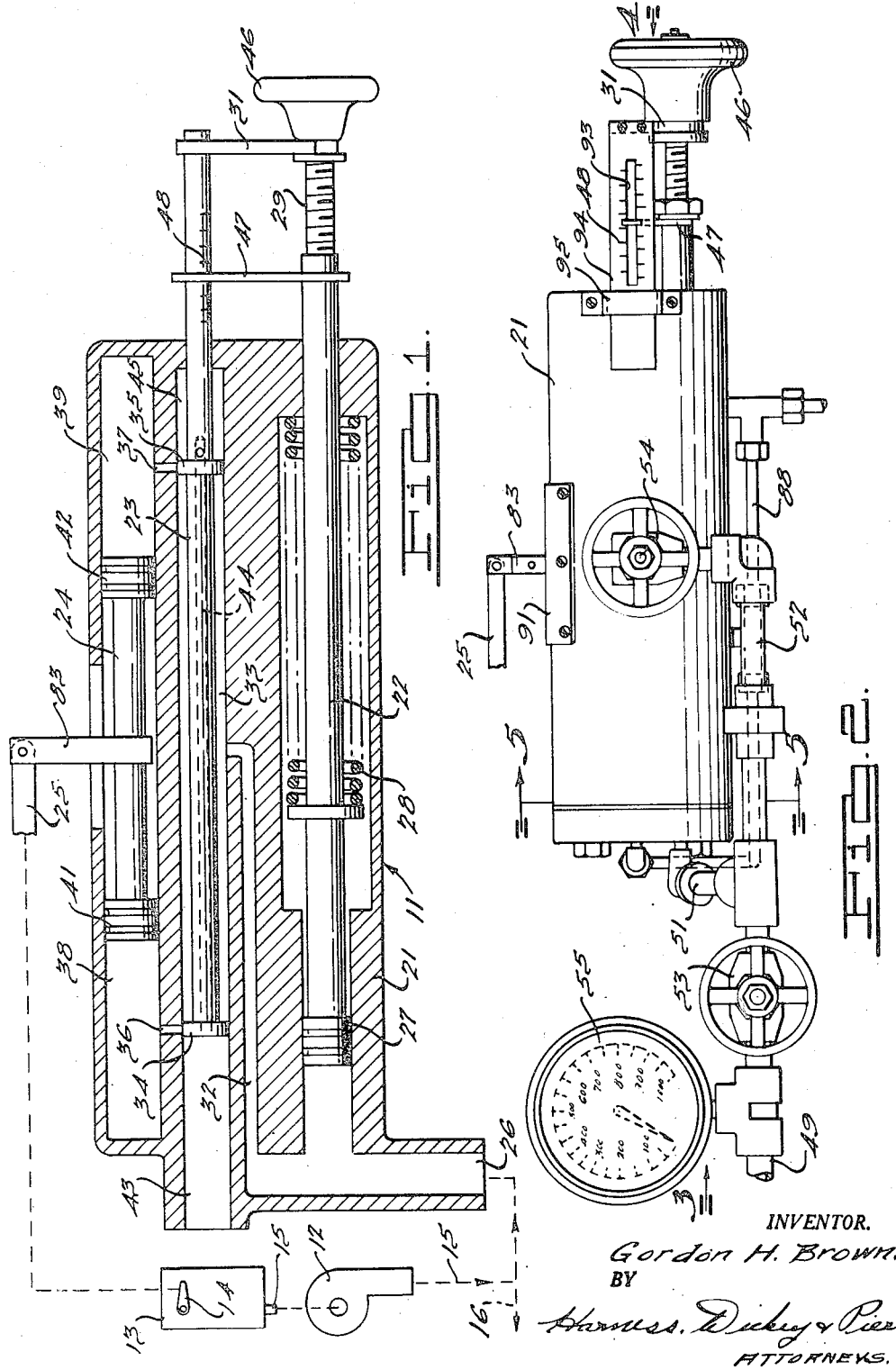
INVENTOR.
Gordon H. Brown.
BY
Harness, Dickey & Pierce
ATTORNEYS.

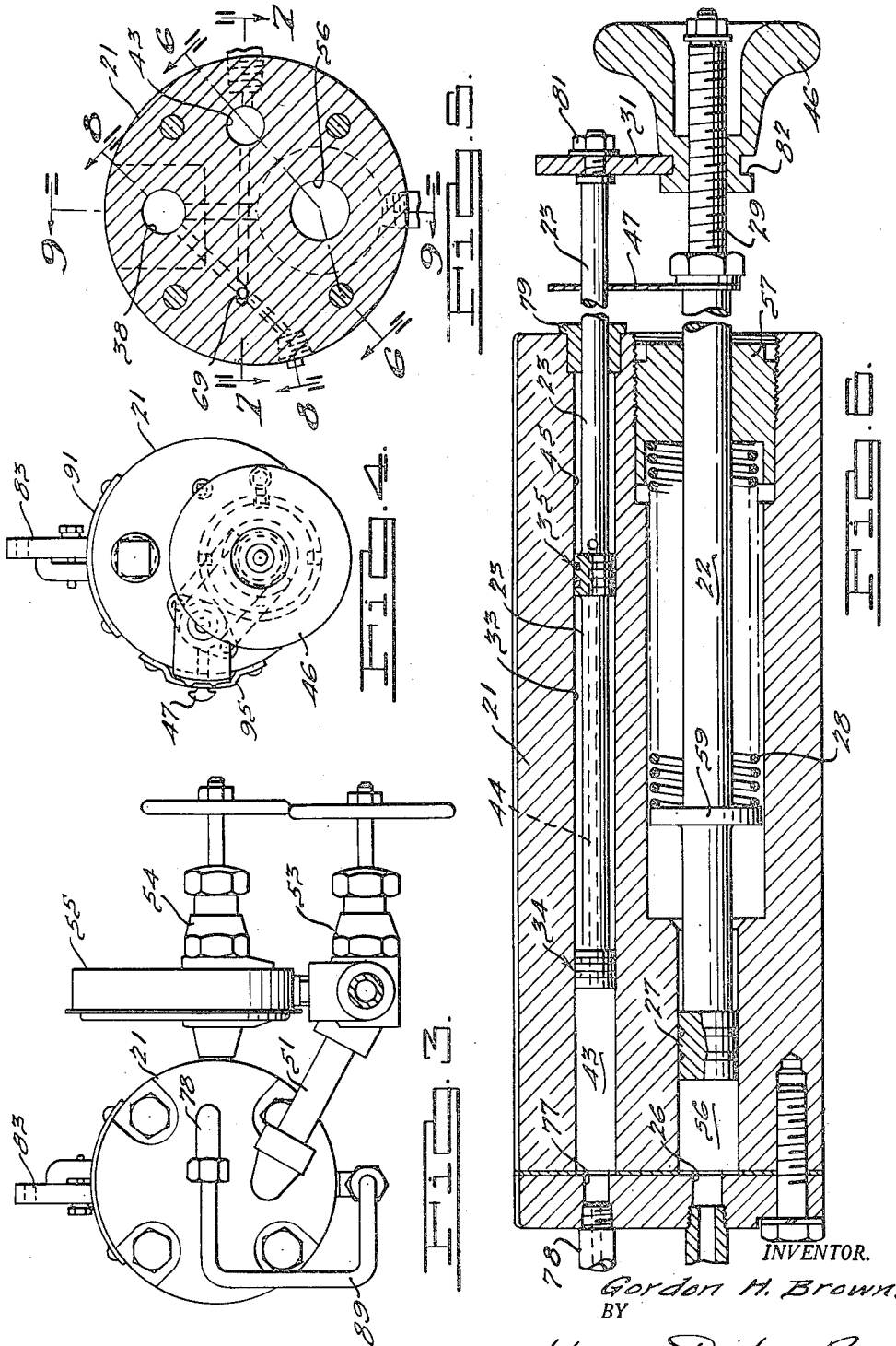

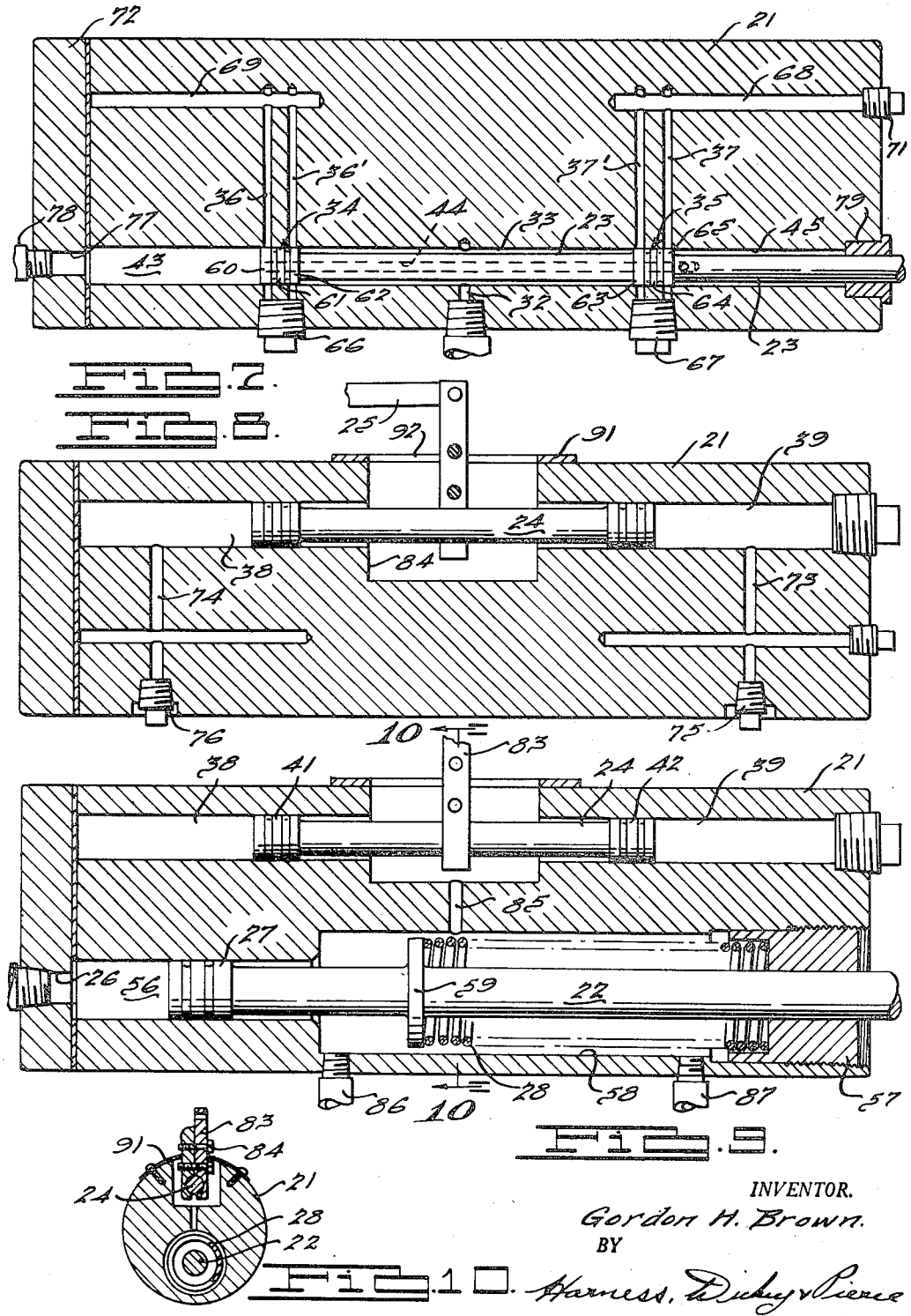

United States Patent Office 2,771,843
Patented Nov. 27, 1956

2,771,843

PRESSURE REGULATOR

Gordon H. Brown, Detroit, Mich., assignor to Earl A. Peterman

Application December 13, 1951, Serial No. 261,412

2 Claims. (Cl. 103—17)

This invention relates to pressure regulators, and more particularly to devices for maintaining a constant delivery head of water or similar incompressible fluid by controlling the prime mover which drives the fluid delivery pump.

The invention is adapted to be used, for example in such installations as fire pumping systems where it is desired to deliver water at a constant pressure to a number of fire hoses, and where the capacity may vary considerably in operation due to shutting down or opening of some or all of the hoses. It is an object of this invention to provide a novel and improved pressure regulator which is continually responsive to delivery pressure for controlling the horsepower delivered by the prime mover to the delivery pump, so that a constant head of pressure is maintained even though the capacity requirements may greatly vary.

It is another object to provide an improved pressure regulator of the above character which is operable over an extremely large range of pressures with equal efficiency, and which is quickly and easily adjustable to different pressure settings.

It is also an object to provide a pressure regulator of the above nature which is especially adapted for controlling internal combustion engine prime movers, and especially for controlling the throttles thereof in accordance with the pressure and horsepower requirements. In connection with this object, it is contemplated to provide such a pressure regulator in which the delivery pressure itself acts directly on the throttle adjusting elements, thereby eliminating the need for a separate source for power for the adjusting function.

It is a further object to provide an improved pressure regulator of the above nature which is of the dynamic rather than the static type, and which will continually move with a small amplitude of motion rather than remain in a constant position during operation, thus providing greater sensitivity of operation.

It is another object to provide a pressure regulator as described above, in which the sensitivity or quickness of response to a change in delivery pressure may be varied at will by controlling the applied power to the adjusting elements of the device.

It is also an object to provide an improved pressure regulator of the above nature which is especially adapted for installation on fire trucks and in similar supports subject to pitching movement, and in which any leakage which may occur will not impair the efficiency of the device.

It is another object to provide an improved pressure regulator of the above nature which has no mechanically interconnected parts subject to wear or breakage but which operates solely on hydraulic principles, thereby increasing the efficiency and life of the device.

Other objects, features and advantages of the present invention will become apparent from the subsequent description taken in conjunction with the accompanying drawings.

In the drawings:

Figure 1 is a schematic cross-sectional diagram of the improved pressure regulator showing the principles of the invention rather than the actual structure of a preferred embodiment, and showing a pump and its prime mover connected to the regulator;

Figure 2 is a side-elevational view of a preferred embodiment of the invention, showing the casing configuration and the adjusting mechanism;

Figure 3 is an end-elevational view of the unit taken in the direction of the arrow 3 of Figure 2, and showing the pressure and drainage conduit connections;

Figure 4 is an elevational view of the other end of the unit taken in the direction of the arrow 4 of Figure 2 and showing the interconnection between the sensing rod and the control valve;

Figure 5 is a cross-sectional view taken along the line 5—5 of Figure 2 and showing the disposition of the sensing rod control valve and actuating piston in the housing;

Figure 6 is a cross-sectional view taken along the line 6—6 of Figure 5 and showing the construction of the sensing rod;

Figure 7 is a cross-sectional view taken along the line 7—7 of Figure 5 and showing the ports leading to and from the control valve;

Figure 8 is a cross-sectional view taken along the line 8—8 of Figure 5 and showing the ports leading to the actuating piston;

Figure 9 is a cross-sectional view taken along the line 9—9 of Figure 5 and showing the drainage system for the housing; and Figure 10 is a cross-sectional view taken along the line 10—10 of Figure 9 and showing the guide plates for the actuator.

The principles upon which the improved pressure regulator operates are shown most clearly in Figure 1, which is a schematic view of the unit but which does not purport to be of the preferred construction. It should be clearly understood that Figure 1 does not correspond in its structural details to the other figures but is merely a schematic diagram showing the operation of the device. However, parts in Figures 2 to 10 are marked with the same reference numerals as their equivalent elements in Figure 1.

The regulator 11 is shown in Figure 1 as controlling the delivery pressure of a fluid pump 12 which is driven by a prime mover 13. The prime mover may be an internal combustion engine having a throttle 14, or other type of prime mover driving the pump through shaft 15. The pump delivers fluid to a delivery line 16 which may be a header having a plurality of outlets (not shown). Fluid pump 12 is a variable delivery pump and may be any one of several types, such as a centrifugal type in which delivery pressure is controlled primarily by torque input or a positive displacement type having pressure primarily dependent on speed.

The pressure regulator as shown schematically in Figure 1 comprises a housing 21 which supports the operative elements of the unit. These elements comprise a sensing rod 22 which is supported for axial movement within the body and extends therefrom, a control valve 23 also supported by the housing and movable with the sensing rod, and an actuating piston 24 the movement of which is controlled by the control valve. The actuating piston in turn is adapted to be connected by a link 25 to the prime mover throttle 14. The power for operating the pressure regulator is derived from the delivery pressure of the fluid itself, this pressure being received through a port 26 and acting upon a piston 27 at the inner end of sensing rod 22. This head pressure is opposed by a coil spring 28 which acts on the sensing rod in a direction opposite to the fluid pressure. For a given fluid pressure the sensing rod will therefore tend to assume a known axial position determined by the spring scale. Since the sensing rod 22 is connected by means 31 to the control valve 23, this valve will also tend to assume a definite position.

The valve 23 controls the admission of fluid pressure to either end of the double-ended piston 24. This is accomplished by a port 32 leading from the delivery side of the pump to the space 33 between the valve lands 34 and 35 on valve 23. These valve lands cooperate with a pair of ports 36 and 37 respectively which are connected with chambers 38 and 39, these chambers being closed by the heads 41 and 42 of piston 24. Depending upon the axial position of valve 23, one or the other of ports 36 and 37 is connected with chamber 33, and the other port with a vent outlet 43. For this purpose, an axial passageway 44 extends through the valve 23, connecting vent opening 43 with a chamber 45 formed by the housing 21 and valve land 35. When valve 23 is moved to the right of its neutral position, pressure chamber 33 will be connected with chamber 39, and chamber 38 will be connected to the drain opening 43. With valve 23 moved to the left, chamber 39 will be connected with the drain opening and chamber 38 with the pressure chamber 33.

In operation, the pressure regulator will first be pre-set by adjusting the relative axial positions of sensing rod 22 and valve 23. This may be done by adjusting the connecting member 31, which is fixed to valve 23 and movable relative to rod 22 by means of a hand wheel 46 mounted on threaded end 29 of rod 22. An indicator 47 secured to rod 22 and readable on a graduated scale 48 may be used for this purpose. Before the pump is started the spring 28 will urge rod 22 and therefore valve 23 to its leftwardmost position. Upon starting the pump, the initial pressure passing through ports 26 and 32 will pressurize chamber 33, this pressure being transmitted through port 36 to chamber 38, moving piston 24 to the right to open the throttle setting of the engine to its highest point. As the pressure increases it will react against piston 27, moving rod 22 and valve 23 to the right until the compression of spring 28 is sufficient to balance this pressure. Since the throttle setting was originally at its highest point, this will normally carry valve 23 past its mid-position, connecting chamber 33 with chamber 39 and moving piston 24 to the left to reduce the throttle setting. The subsequent reduction in pressure will cause spring 28 to move rod 22 and valve 23 again to the left, thus increasing the throttle setting. This action will continue in progressively decreasing amplitudes until an equilibrium position is reached. Normally this equilibrium position will be such that valve 23 will move alternately to the right and left slightly exposing ports 36 and 37, thus raising and lowering the throttle setting in the vicinity of the setting required for the desired pressure. Should the horsepower requirements of the equipment be increased, for example, by the opening of additional fire nozzles if the pump is being used in a fire-fighting unit, the immediate result would be a momentary reduction in pressure at port 26, allowing leftward movement of valve 23 until the throttle setting is sufficiently increased. Similarly, a decrease in horsepower requirements will cause a lower throttle setting. It will be observed that the throttle actuating piston 24 is at all times positively positioned, since there is always fluid in both sides of piston 24.

Referring now to Figures 2 to 10, these figures illustrate a preferred embodiment of the pressure regulator utilizing the principles described with relation to the schematic construction of Figure 1. As stated previously, the elements of construction in the preferred embodiment which correspond to elements in the schematic view are given corresponding reference numerals. It will be understood of course that other embodiments of the invention incorporating the principles of operation of the device could be constructed within the scope of the invention.

The embodiment of Figures 2 to 10 comprises a housing 21 of generally cylindrical shape which supports the sensing rod 22, the valve 23 and the piston 24. A pressure line 49 from the pump is connected to the housing 21 by means of a conduit 51 leading to port 26 and a conduit 52 leading to port 32. A shut-off valve 53 may be placed in conduit 49 and a restriction valve 54 in conduit 52 to control the flow therethrough. A pressure gauge 55 may also be placed in line 49 if desired. Port 26 leads to a chamber 56 which is closed by piston 27 at the inner end of rod 22. This rod extends outwardly of the housing 21, a bushing 57 being threadably mounted in the housing to support the rod and adjustably compress spring 28, which is disposed within a clearance bore 58 in the housing and surrounds rod 22. One end of spring 28 abuts bushing 57 and the other end abuts a shoulder 59 on rod 22, so that the spring constantly urges piston 27 toward port 26, tending to reduce the volume of chamber 56.

Port 32 leads to chamber 33 which is intermediate the two land portions of valve 23, these land portions being generally indicated at 34 and 35. Land portion 34 comprises a group of lands 60, 61 and 62 which control a pair of parallel ports 36 and 36'. Likewise, land 35 comprises a plurality of lands 63, 64 and 65 which control a pair of parallel ports 37 and 37'. In the illustrated embodiment these ports may be formed by drilling from the exterior of the housing through the valve bore and closing the drilled holes with plugs 66 and 67. Ports 37 and 37' are connected with chamber 39, and ports 36 and 36' with chamber 38. For this purpose passageways 68 and 69 are drilled from the end portions of the housing, passageway 68 connecting with ports 37 and 37', and passageway 69 with ports 36 and 36'. The end of passageway 68 may be closed by a plug 71 and the end of passageway 69 by an end cap 72 on the housing 21, this end cap containing the port 26. As seen in Figure 8, additional passageways 73 and 74 are formed to connect passageways 68 and 69 with chambers 39 and 38 respectively, passageways 73 and 74 being closed by plugs 75 and 76.

The drain spaces 43 and 45 are connected to a drain port 77 in end cap 72, space 45 being connected thereto by axial passageway 44 within piston 23 which has a radial end portion connecting with this space. The drain port 77 is connected to a drain line by a conduit 78 connected to cap member 72. The outwardly extending end of valve 23 is supported by a bushing 79 and is connected to sensing rod 22 by a forked member 31 which is secured by a nut 81 to the end of valve 23, the forked ends of member 31 being rotatably connected with hand wheel 46 by means of a slot 82 in the hand wheel hub. The hand wheel is mounted on the threaded end 29 of rod 22 so that rotation of the hand wheel will cause relative axial movement of rod 22 and valve 23.

The link 25 is secured to piston 24 by means of a clamp 83 secured to the piston at an intermediate point, the link being pivoted to clamp 83. A clearance recess 84 in the housing allows axial movement of the piston together with the clamp. Means are provided for draining any water which may collect in recess 84, and this means preferably comprises a drain passage 85 leading from the recess 84 into clearance bore 58, so that any water collecting in recess 84 will immediately run into bore 58. A pair of drain lines 86 and 87 are connected to the opposite ends of bore 58 and run to a drain header 88, this header also receiving the fluid from vent line 78 by means of a conduit 89. The position of drain lines 86 and 87 therefore allows proper drainage even though the device may be tilted during operation. A guide plate 91 secured to the top of housing 21 and having a slot 92 serves to maintain the upright position of clamp 83, therefore holding the link 25 in operative position throughout its movement.

The indicating means for showing the pressure setting comprises an indicator 47 which is secured to rod 22 and moves within a slot 93 in an indicator plate 94 having indicia 48. The indicator plate is secured to adjusting member 31 which is in turn secured to valve 23, and the relative positions of indicator 47 and indicator plate 94 will therefore show the chosen pressure setting when calibrated. The indicator plate may be supported by a bracket 95 on housing 21.

The operation of the unit of Figures 2-10 is identical with that described with relation to the schematic view of Figure 1. It will be noted that in the preferred embodiment the need of close tolerances in fitting the moving elements in the housing is eliminated, since any leakage will not affect the operation of the device. For example, water leaking past piston 27 will merely drain through lines 86 and 87, and fluid leaking past pistons 41 and 42 will do likewise. The valve 54 preferably is a needle valve or similar type of valve which can closely control the amount of fluid passing into pressure chamber 33. It is thus possible to greatly vary the sensitivity of the device, since it will be apparent that if the rate of flow of fluid into chambers 38 and 39 is restricted, the throttle actuating link 25 can only move slowly despite the position of valve 23. Likewise, if the flow to chambers 38 and 39 is unrestricted this will permit very rapid shifts in the throttle setting.

The rate of flow of fluid to chambers 38 and 39 is also controlled by the position of valve 23 relative to its controlled ports. During the initial phases of operation the amplitude of movement of valve 23 will be relatively great, so that both ports of each pair (36, 36′, 37, 37′) will be uncovered at once, allowing relatively greater flow and therefore rapid throttle movements. As the regulator reaches a condition of equilibrium the amplitude of movement of valve 23 will decrease so that only one port in each pair will be opened. The movements of piston 24 will therefore be slower, and the danger of overcompensation lessened.

While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

I claim:

1. In a pressure regulator, a unitary housing, a first member comprising a sensing rod supported for axial movement within said housing and extending from one end thereof, a spring urging said sensing rod toward the other end of said housing, a piston at the inner end of said sensing rod, a port at said other end of the housing connected to said piston, said port being adapted for connection to the delivery side of a pump, a second member comprising a spool valve slidably mounted in a bore in said housing parallel to said sensing rod and extending from said one end of the housing, a connecting element having one end fixedly secured to one of said members outside of said housing and extending toward said other member, a threaded portion on the other member, a rotatable handle threadably mounted on said threaded portion, a connection between said handle and the other end of said connecting element, whereby said first and second members are secured together for movement in unison and are axially adjustable relative to each other, and actuating member slidably mounted within said housing parallel to said first and second members, a pair of piston heads at opposite ends of said actuating member, a pair of chambers formed in said housing within which said piston heads are disposed, a pair of ports connecting said chambers to said valve bore, a connection in said housing from said pump delivery port to said valve bore between said first two connections, connections from the opposite ends of said valve bore to the atmosphere, said valve being movable in response to changes in fluid pressure exerted on said sensing rod from a neutral position in which said pair of ports are closed, in either direction to a position connecting one of said pair of ports to pump delivery pressure and the other port to atmosphere, and means adapted to connect said actuating member to a power-controlling portion of a prime mover.

2. In a pressure regulator, a unitary housing, a first member comprising a sensing rod supported for axial movement within said housing and extending from one end thereof, a spring urging said sensing rod toward the other end of said housing, a piston at the inner end of said sensing rod, a port at said other end of the housing connected to said piston, said port being adapted for connection to the delivery side of a pump, a second member comprising a spool valve slidably mounted in a bore in said housing parallel to said sensing rod and extending from said one end of the housing, means securing together said first and second elements for movement in unison, means included in said securing means for permitting relative axial adjustment between said first and second member, an actuating member slidably mounted within said housing parallel to said first and second members, a pair of piston heads at opposite ends of said actuating member, a pair of chambers formed in said housing within which said piston heads are disposed, a pair of ports connecting said chambers to said valve bore, a connection in said housing from said pump delivery port to said valve bore between said first two connections, connections from the opposite ends of said valve bore to the atmosphere, said valve being movable in response to changes in fluid pressure exerted on said sensing rod from a neutral position in which said pair of ports are closed, in either direction to a position connecting one of said pair of ports to pump delivery pressure and the other port to atmosphere, and means adapted to connect said actuating member to a power-controlling portion of a prime mover for said pump.

References Cited in the file of this patent

UNITED STATES PATENTS

| 810,666 | McMullen | Jan. 23, 1906 |
| 944,255 | Bong | Dec. 28, 1909 |
| 1,006,803 | Stevens | Oct. 24, 1911 |
| 1,190,799 | Rene | July 11, 1916 |
| 1,240,531 | Banner | Sept. 18, 1917 |
| 1,341,696 | Wilkin | June 1, 1920 |
| 1,415,647 | Huff | May 9, 1922 |
| 1,863,406 | Hudson | June 14, 1932 |
| 2,535,617 | Westbrook | Dec. 26, 1950 |
| 2,642,805 | Nepper | June 23, 1953 |